(12) United States Patent
Al-Omari et al.

(10) Patent No.: US 12,524,681 B2
(45) Date of Patent: Jan. 13, 2026

(54) PERFORMING HYPERPARAMETER TUNING OF MODELS IN A MASSIVELY PARALLEL DATABASE SYSTEM

(71) Applicant: Teradata US, Inc., San Diego, CA (US)

(72) Inventors: Awny Kayed Al-Omari, Cedar Park, TX (US); Maksym Sergiyovych Oblogin, Austin, TX (US); Khaled Bouaziz, Round Rock, TX (US); Michael James Hanlon, Austin, TX (US); Kashif Abdullah Siddiqui, Round Rock, TX (US)

(73) Assignee: Teradata US, Inc., San Diego, CA (US)

(*) Notice: Subject to any disclaimer, the term of this patent is extended or adjusted under 35 U.S.C. 154(b) by 1072 days.

(21) Appl. No.: 17/124,200

(22) Filed: Dec. 16, 2020

(65) Prior Publication Data

US 2021/0397975 A1    Dec. 23, 2021

Related U.S. Application Data

(60) Provisional application No. 63/040,329, filed on Jun. 17, 2020.

(51) Int. Cl.
| | | |
|---|---|---|
| *G06N 3/126* | (2023.01) | |
| *G06F 16/25* | (2019.01) | |
| *G06F 16/28* | (2019.01) | |
| *G06N 20/00* | (2019.01) | |

(52) U.S. Cl.
CPC ............ *G06N 3/126* (2013.01); *G06F 16/25* (2019.01); *G06F 16/284* (2019.01); *G06N 20/00* (2019.01)

(58) Field of Classification Search
CPC ............................ G06N 20/00; G06N 3/0985
See application file for complete search history.

(56) References Cited

U.S. PATENT DOCUMENTS 10,360,517 B2 * 7/2019 Koch ..................... G06N 5/01

OTHER PUBLICATIONS

What is RDBMS?. EDUCBA. Mar. 6, 2020. https://web.archive.org/web/20200306193846/https://www.educba.com/what-is-rdbms/ (Year: 2020).*

(Continued)

*Primary Examiner* — Tsu-Chang Lee
(74) *Attorney, Agent, or Firm* — Gates & Cooper LLP

(57) ABSTRACT

Hyperparameter tuning for a machine learning model is performed in a massively parallel database system. A computer system comprised of a plurality of compute units executes a relational database management system (RDBMS), wherein the RDBMS manages a relational database comprised of one or more tables storing data. One or more of the compute units perform the hyperparameter tuning for the machine learning model, wherein the hyperparameters are control parameters used in construction of the model, and the tuning of the hyperparameters is implemented as an operation in the RDBMS that accepts training and scoring data for the model, constructs the model using the hyperparameters and the training data, and generates goodness metrics for the model using the scoring data.

17 Claims, 5 Drawing Sheets

(56) References Cited

OTHER PUBLICATIONS

Akiba, Takuya, et al. "Optuna: A next-generation hyperparameter optimization framework." Proceedings of the 25th ACM SIGKDD international conference on knowledge discovery & data mining. 2019. (Year: 2019).*

Starfish, Daniel Griscom, & ianmandarini. What does it mean for an algorithm to converge? Software Engineering Stack Exchange. Nov. 29, 2019. https://softwareengineering.stackexchange.com/a/401791 (Year: 2019).*

* cited by examiner

PERFORMING HYPERPARAMETER TUNING OF MODELS IN A MASSIVELY PARALLEL DATABASE SYSTEM

CROSS REFERENCE TO RELATED APPLICATIONS

This application is related to the following co-pending and commonly-assigned application:

U.S. Provisional Patent Application Ser. No. 63/040,329, filed on Jun. 17, 2020, by Awny Kayed Al-Omari, Maksym Sergiyovych Oblogin, Khaled Bouaziz, Michael James Hanlon, and Kashif Abdullah Siddiqui, and entitled "PERFORMING HYPERPARAMETER TUNING IN MASSIVELY PARALLEL DATABASE SYSTEMS,"

which application is incorporated by reference herein.

BACKGROUND OF THE INVENTION

1. Field of the Invention

This invention relates to methods and systems for performing hyperparameter tuning in massively parallel database systems.

2. Description of Related Art

Machine learning (ML) functions use control parameters to construct a machine learning model. These control parameters have a significant impact on the quality and performance of the model. Tuning such parameters to obtain a high-quality model is an essential aspect of machine learning.

Many analytics libraries provide capabilities for tuning such control parameters. Examples of that are Scikit Learn™, R™, etc. Some massively parallel processing (MPP) computer systems, such as cloud-based analytics platforms, such as Spark™, H2O™, etc., parallelize the tuning of control parameters using a traditional partition-the-data paradigm.

Nonetheless, there is a need in the art for improved methods and systems for tuning control parameters for machine learning models. This invention satisfies that need.

SUMMARY OF THE INVENTION

One or more embodiments of the invention provides an apparatus, method and computer program product for performing hyperparameter tuning for a machine learning model in a massively parallel database system. A computer system comprised of a plurality of compute units executes a relational database management system (RDBMS), wherein the RDBMS manages a relational database comprised of one or more tables storing data. One or more of the compute units perform the hyperparameter tuning for the machine learning model, wherein the hyperparameters are control parameters used in construction of the model, and the tuning of the hyperparameters is implemented as an operation in the RDBMS that accepts training and scoring data for the model, constructs the model using the hyperparameters and the training data, and generates goodness metrics for the model using the scoring data.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

As noted above, machine learning functions use control parameters to guide a search algorithm toward the construction of a model. These control parameters, also called hyperparameters, have a significant impact on the quality and performance of the generated model. Tuning hyperparameters to obtain a high-quality model is an essential process of the data science lifecycle.

This invention presents a novel method for performing hyperparameter tuning in parallel at scale in an MPP database system. The processing takes place in-platform and hence avoids the cost of moving the data in and out of the system and, more importantly, conforms to the data governance niles and policies.

The invention is implemented using database operations such as table operators that execute in parallel and utilizes a novel approach for parallelizing tasks by partitioning the hyperparameters search space across the MPP database system. This solution is general and applies to a large class of machine learning functions without the need for changes in the functions themselves.

Hardware and Software Environment

Figure 1:
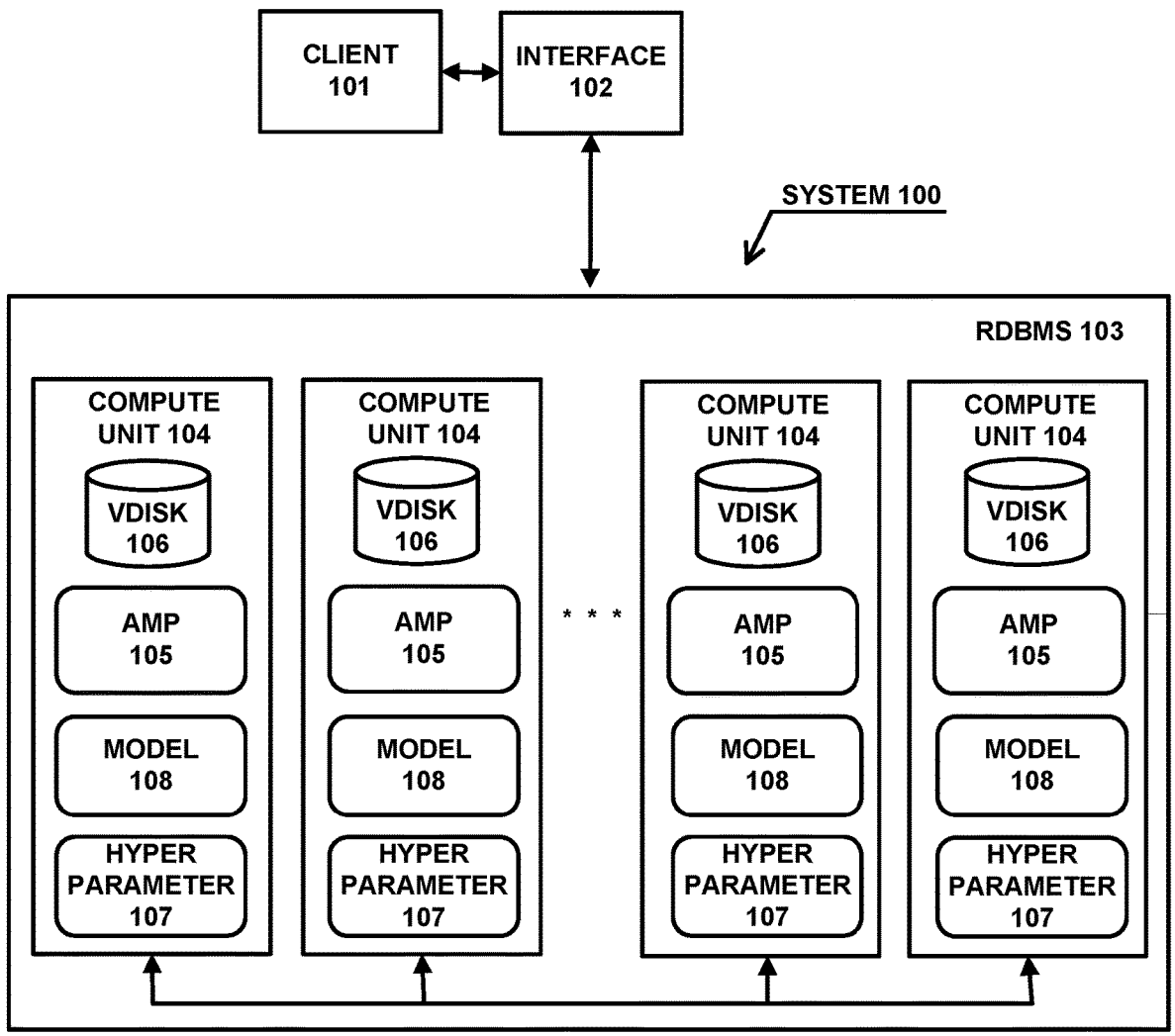
FIG. 1 illustrates an exemplary hardware and software environment according to the preferred embodiment of the present invention.

FIG. 1 illustrates an exemplary hardware and software environment according to the preferred embodiment of the present invention. In the exemplary environment, an MPP database system 100 is implemented in a three-tier client-server architecture, wherein the first or client tier provides clients 101 that may include, inter alia, a graphical user interface (GUI), the second or middle tier provides an interface 102 for interfacing with a central database system or data warehouse, and the third or server tier comprises the central database system or data warehouse, which is a relational database management system (RDBMS) 103 that stores data and metadata in a relational database. The first, second, and third tiers may be implemented in separate machines, or may be implemented as separate or related processes in a single machine.

In the preferred embodiment, the RDBMS 103 includes one or more compute units 104, e.g., processors, executing one or more access module processors (AMPs) 105 performing the functions of the RDBMS 103 and one or more virtual disks (VDISKs) 106 storing the relational database of the RDBMS 103. The compute units 104, AMPs 105, and VDISKs 106, may be implemented in separate machines, or may be implemented as separate or related processes in a single machine.

The RDBMS 103 used in the preferred embodiment comprises one or more Teradata® systems sold by Teradata US, Inc., the assignee of the present invention, although other DBMS's could be used. In this regard, the Teradata® systems are a hardware and software based database system, data warehouse and analytic application system.

Generally, operators or users of the system 100 use the clients 101 to formulate requests for the RDBMS 103, wherein the requests are transmitted via the interface 102 to the RDBMS 103. In response to the requests, one or more compute units 104 of the RDBMS 103 performs the functions and steps described below, including tuning hyperparameters 107 for a machine learning model 108, wherein the hyperparameters 107 are control parameters used in construction of the model 108, and the tuning of the hyperparameters 107 is implemented as an operation in the RDBMS 103, such as a table operator, that accepts training and scoring data for the model 108, constructs the model 108 using the hyperparameters 107 and the training data, and generates goodness metrics for the model 108 using the scoring data. Moreover, the results from these functions and steps may be provided directly to clients 101, or may be provided to other systems (not shown) by the interface 102, or may be stored by the RDBMS 103 in the relational database.

Note that, in one or more embodiments, the system 100 may use any number of different parallelism mechanisms to take advantage of the parallelism offered by the multiple tier architecture, the client-server structure of the client 101, interface 102, and RDBMS 103, and the multiple AMPs 105 and VDISKs 106 of the RDBMS 103. Further, data within the relational database may be partitioned across multiple data storage devices to provide additional parallelism.

Generally, the system 100, clients 101, interface 102, RDBMS 103, compute units 104, AMPs 105, VDISKs 106, hyperparameters 107 and models 108, each comprise hardware and/or software, including logic and/or data tangibly embodied in and/or accessible from a device, media, carrier, or signal, such as RAM, ROM, one or more of the data storage devices, and/or a remote system or device communicating with the system 100 via one or more data communications devices. Elements of 101-108 may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media. Accordingly, such articles of manufacture are readable by a computer and embody at least one program of instructions executable by a computer to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Hyperparameter Tuning

As noted above, hyperparameter 107 tuning is an essential procedure in the model 108 building and learning step in the data science life cycle. Model 108 training algorithms use control parameters 107 to set up and define their search strategy toward producing the model 108. These control parameters 107 are called hyperparameters 107 in order to differentiate them from the generated parameters of the model 108 itself. Examples of hyperparameters 107 and their models 108 are tree depth in decision trees; number of learners in ensemble models; number and size of layers in neural networks; as well as step size, learning rate, and regularization parameters.

Hyperparameter 107 tuning is an optimization process with the goal of finding the "best" combination of hyperparameters 107. The process is expensive as it involves the evaluation of numerous combinations of hyperparameters 107, where each evaluation involves the process of building a model 108 based on a particular combination of hyperparameters 107 utilizing a subset of the data to train the model 108 (training data), scoring the trained model 108 with another subset of the data (scoring data), and evaluating the goodness of the model 108 based on the difference between training and scoring data.

Data often resides on a database system 100, where pulling the data out of the system 100 to build and evaluate machine learning models 108 on separate systems is not favorable or not acceptable from a data governance point of view. Some modern database systems 100 now provide the capability to perform machine learning in-platform, without data leaving the system 100. One way to perform hyperparameter 107 tuning is by driving the system's 100 machine learning algorithms externally via an optimization application or script. This is very inefficient and costly due to the overhead of each training and scoring query 107 and the need to run a number of those queries 107.

Many of today's database systems and analytic platforms provide the ability to run at scale, utilizing their MPP architecture, such as Teradata®, Spark™, Snowflake™, Vertica™, Impala™, and Greenplum™. MPP systems, however, work by executing the exact same task on different partitions of the data, while hyperparameter 107 tuning needs to apply different tasks (different control parameters 107) on the same set of training and scoring data. This invention addresses the problem of performing hyperparameter 107 tuning efficiently on an MPP system 100, utilizing the scale and parallelism of the MPP system 100, maintaining data governance, and providing the added advantage of combining the hyperparameter 107 search tasks with other platform data manipulation, aggregation, and analysis capabilities.

Optimizing Hyperparameter Tuning

In essence, hyperparameter 107 tuning is an optimization problem. As a matter of fact, the solution provided herein can be extended as a general optimization solution for objective functions that input data and are controlled by a set of parameters 107.

An optimization problem is defined by an objective function to minimize or maximize results, and a search space for the parameters 107, with the goal to find the combination(s) of parameters 107 that achieves the optimal results for the function. In the case of hyperparameter 107 tuning, the objective function computes one or more goodness metrics for the model 108 generated using a specified training function on a specified data set comprised of training data and using a specified combination of hyperparameters 107.

The search space for the hyperparameters 107 is defined by one or more combinations of the hyperparameters 107. In practice, since this search space could be infinite, e.g., in the presence of a continuum of numerical hyperparameters 107, the search space is regularly reduced by discretizing the hyperparameters 107 over a practical range of discrete values. Often, the search space, while not infinite, is still huge due to the numerous possible combinations of hyperparameters 107.

Optimization procedures are comprised of two primary components: an optimizer/enumerator, and one or more function evaluators. The optimizer/enumerator enumerates the combinations of hyperparameters 107 in the search space based on an optimization algorithm. The function evaluator computes an objective function for the combinations of the hyperparameters 107 enumerated in the search space, wherein the objective function computes one or more goodness metrics for the model 108 generated using one or more of the combinations of the hyperparameters 107 enumerated in the search space, to identify an optimal one of the combinations of the hyperparameters 107.

A common and simple optimization strategy is a grid search, where each combination of hyperparameters 107 is enumerated and evaluated, and the combination of hyperparameters 107 producing the best objective function results is chosen. When the search space is too large to be evaluated exhaustively, more intelligent methods are used to enumerate only a manageable part of the search space while finding optimal or near-optimal combination(s) of hyperparameters 107.

One method of implementing a hyperparameter 107 tuning strategy would be to use the system's 100 application programing interface (API) for the function evaluator, wherein the API may comprise a query formulated using a structured query language (SQL) in the case of a database system 100 capable of machine learning. The optimizer/enumerator, which could be an external application or internal driving procedure, would generate a system 100 call or query for every function evaluation. This approach is referred to as a brute force approach. The problem with this approach is that the overhead of starting each query is high, especially for the case of an MPP system 100. This overhead would dominate the processing time of the optimization strategy execution.

This invention proposes an alternative that suggests pushing the orchestration of the numerous function evaluations in-platform. Instead of executing each function evaluation in parallel, paying the price of query and parallelism overhead, this invention parallelizes the process by executing numerous function evaluations concurrently, each on a separate parallel processing compute unit 104.

The MPP system 100 is designed to perform data partition parallelism. That is, the input data is partitioned M-way (where M is the number of parallel processing compute units 104) and each compute unit 104 executes the exact same task on the data partition assigned to it. The results are then combined or passed to the next execution step in the query workflow.

Here, this invention proposes a different parallel paradigm on the MPP system 100, where each parallel processing compute unit 104 (also referred to as a worker 104) acts on the same data set (or a copy of it), but executing a different task based on different combination of hyperparameters 107. In other words, this invention partitions and/or parallelizes the search space rather than partitioning and/or parallelizing the data.

Specifically, the search space is partitioned across the compute units 104 to parallelize the tuning of the hyperparameters 107. Then, a plurality of the compute units 104 perform the function evaluator concurrently using the search space that is partitioned across the compute units 104.

To compare the performance difference between the two approaches, consider the following simple estimations:

h is the system 100 overhead of a single query execution in wall clock time unit, c is the cost of executing a single objective function evaluation in process time unit, M is the number of parallel processing compute units 104 (workers 104), and N is the number of function evaluations executions throughout the optimization procedure.

For the partition-the-data approach, one can see that the total execution time is equal to:

$$T_d = N*(h+c/M)$$

In reality, this underestimates the cost as it assumes that the parallel execution time scales linearly with number of workers 104 aside from the overhead time. In general, many of the machine learning algorithms such as neural networks do not exhibit linear scalability and hence $T_d$ is expected to be quite higher for this class of algorithms.

For the new proposal of partition-the-search-space approach, one can see that the total execution time is equal to:

$$T_S = h + c*N/M$$

The value of $T_d$ is clearly higher than $T_S$, and for a typical short objective function evaluation, the expected difference could be orders of magnitude in favor of the new approach.

Take the realistic example of (h=0.5 sec, c=2 CPU seconds, M=100 workers 104, and N=1000 evaluations). For such an example, $T_d$=520 seconds, and $T_S$=20.5 (~25× improvement). Using values for c=(0.1 second, 1 second, and 10 seconds) results in improvements of (330×, 50×, and 6×) respectively. When accounting for the sub-linear scalability of many machine learning algorithms, the improvement of the new approach is even higher.

Note that a limitation of the partition-the-search-space approach described in this invention is the restriction of running a training algorithm on a single worker 104 (for a given hyperparameter 107 combination). This would be a major limitation if the training data set is too large and exceeds the memory of an individual worker 104. However this problem can be simply addressed by sampling the data set to get a reduced size that fits in memory. For the overwhelming majority of the cases, this process is sufficient. Moreover, the final winning model 108 can be still refined by rebuilding the final model 108 using the same winning hyperparameter 107 combinations while running on the entire data set using the traditional partition-the-data paradigm. This way, the invention gets the performance of the partition-the-search-space approach on the sample data for the bulk of the hyperparameter 107 combinations evaluations, while getting the assurance of running on the entire data set for the last steps of winning model 108 convergence.

This solution is implemented in the system 100 as an operation, such as a table operator, in the RDBMS 103, wherein the table operator is an operation that takes one or more tables as input and generates a table as output. More specifically, the table operator includes training and scoring functions used for computation of the objective function, wherein the training data is used by the training function to train the model 108 generated using the hyperparameters 107; the scoring data is used by the scoring function to score the model 108 trained by the training function; and the goodness metrics are used to evaluate the model 108 scored by the scoring function. Some of the examples of goodness metrics are: sum of mean-squared errors of the scoring data relative to the training data, precision of the scoring data relative to the training data, accuracy of the scoring data relative to the training data, an F-measure of the scoring data relative to the training data, etc.

The table operator may also include one or more optimization algorithms for the enumerator, and the enumerator performs a selective enumeration of the combinations of the hyperparameters 107 in the search space based on the optimization algorithm. The enumerator repeats the selective enumeration of the combinations of the hyperparameters 107 in the search space until a convergence is reached based on the optimization algorithm.

Optionally, the table operator may include one or more arguments for: a ratio of the training and scoring data split used for verification; a k-fold value for cross-validation of the training and scoring data; and the goodness metrics used for comparison of predicted and actual values for the training and scoring data used by the model 108.

First Embodiment

In a first embodiment of this invention, the table operator, named ParamSpaceEnumerator, performs the following:
1. Takes as an input a data set that will be used for optimizing the hyperparameters 107. The data set includes both training and scoring data.
2. Takes as an input a table containing the combinations of the hyperparameters 107 in the search space.
3. Takes as an argument the names (identifiers) of both the training and scoring functions used for the computation of the objective function.
4. Optionally, takes as an argument a ratio of training-to-scoring data in a split used for verification. Alternatively, may take the k-fold value for the choice of cross-validation. In addition, it takes the goodness metrics to be used for comparison of the predicted and actual values for the measurement of the goodness of the model 108 generated by the hyperparameters 107.

Note that the ParamSpaceEnumerator table operator is not limited to a particular machine learning algorithm, but is applicable to all training and scoring functions satisfying a standard API. The training and scoring functions are passed as arguments to the table operator and are loaded at runtime. Thus, there is one ParamSpaceEnumerator table operator for all machine learning functions. The training and scoring functions are then executed as part of the objective function evaluation against the data set in the first input table and using hyperparameter 107 combinations from the second input table.

The syntax for the ParamSpaceEnumerator table operator is shown below:

```
SELECT *
FROM ParamSpaceEnumerator (
    ON<data_table> REPLICATE
    ON<hyperparameter_table> PARTITION BY RANDOM
    Trainer (<training_function>)
    Scorer (<scoring_function>)
    {Split(<split_ratio>) | KFold(<kfold_value>)}
    Metrics(<goodness_metrics>)
)
```

The SELECT statement returns a result set of records, comprising a set of columns, in this example, all columns (*), generated by ParamSpaceEnumerator. The FROM clause specifies the source of the data, in this example, the table operator labeled as ParamSpaceEnumerator, which may comprise a user-defined function (UDF), stored procedure (SP), built-in function, etc., of the RDBMS 103. The table operator accepts <data_table> (i.e., training and scoring data) and <hyperparameter_table> (i.e., combinations of hyperparameters 107) as primary input tables or relations, wherein the ON clauses specify input tables. The REPLICATE clause instructs the RDBMS 103 to replicate the <data_table> across one or more of the compute units 104, and the PARTITION BY RANDOM clause instructs the RDBMS 103 to randomly partition the <hyperparameter_table> across the one or more compute units 104. (Note that other uniform distribution methods, such as Round Robin distribution, are equally good alternatives.) The <training_function> and <scoring_function> can be specified on the table operator, as well as <goodness_metrics>, along with alternative clauses represented within the brackets, including <split_ratio> and <kfold_value>, wherein the vertical bars represent an "and/or" combination of the alternative clauses.

Figure 2:
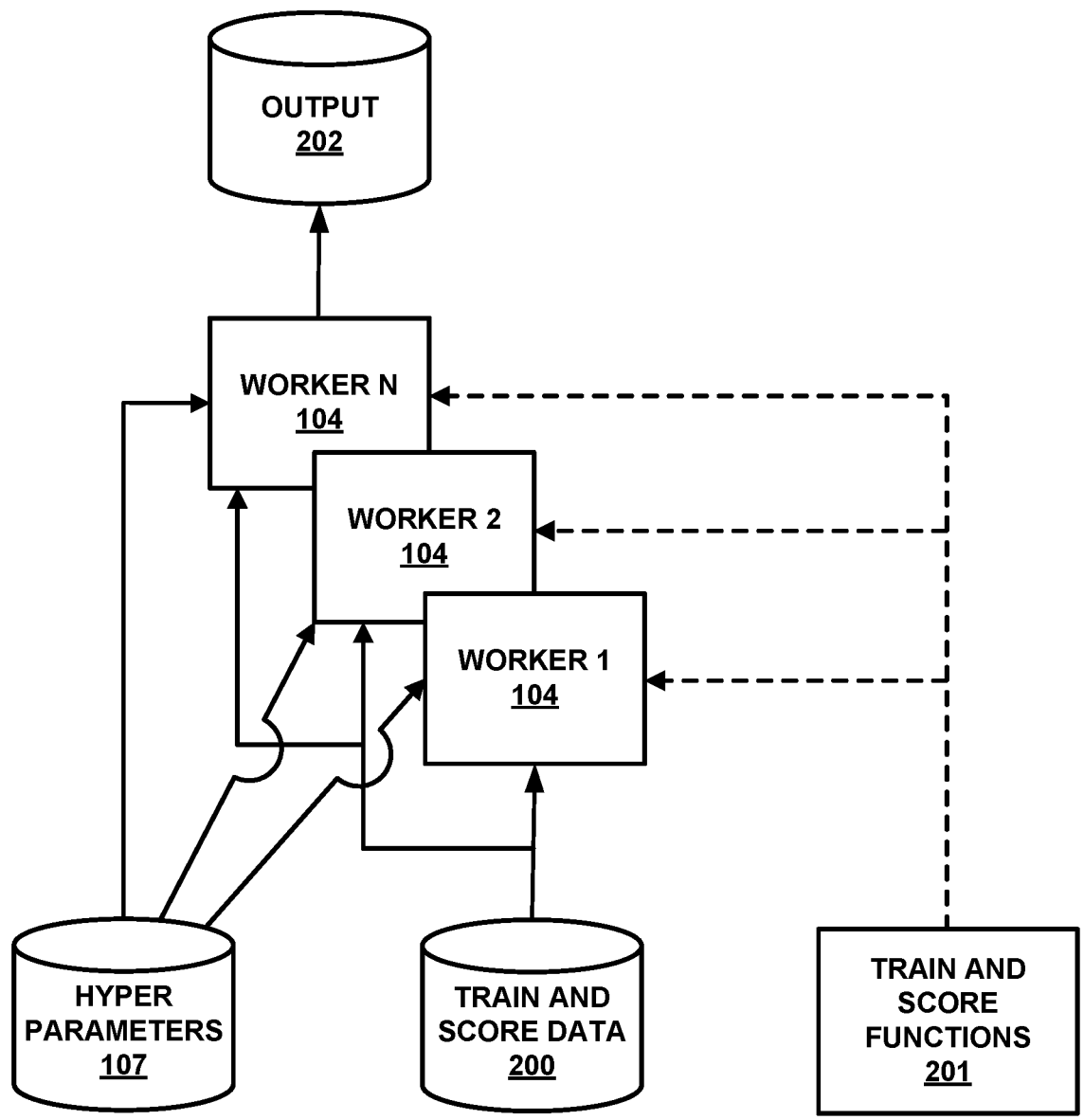
FIG. 2 is a schematic diagram that illustrates a workflow of a ParamSpaceEnumerator operator.
Figure 3:
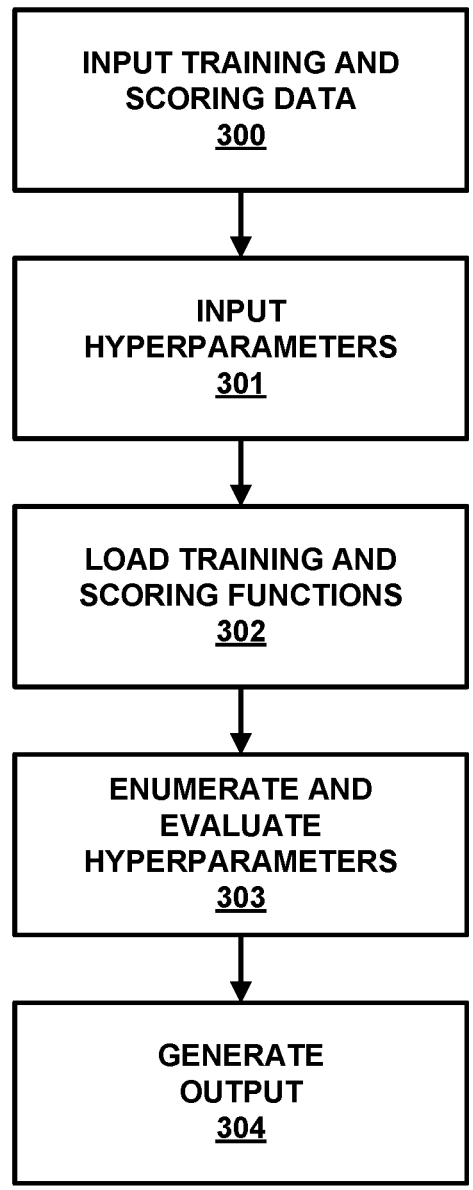
FIG. 3 is a flowchart that illustrates a workflow of the ParamSpaceEnumerator operator.

FIG. 2 is a schematic diagram and FIG. 3 is a flowchart that illustrate a workflow of the ParamSpaceEnumerator table operator. In these figures, the compute units 104 are referred to as workers 1, 2, . . . , N 104.

Block 300 represents the workers 1, 2, . . . , N 104 inputting a data set 200 comprised of training and scoring data that is used to build the machine learning models 108 and evaluate them. In this block, the data set 200 is replicated across the workers 1, 2, . . . , N 104, and then split into test and learning data. Alternatively, the data set 200 could be split first, and then replicated.

Block 301 represents the workers 1, 2, . . . , N 104 inputting the hyperparameter 107 combinations, which are used to drive the enumeration. In this block, the hyperparameter 107 combinations are partitioned across the workers 1, 2, . . . , N 104.

Block 302 represents the workers 1, 2, . . . , N 104 loading training and scoring functions 201 for the model 108.

Block 303 represents each of the workers 1, 2, . . . , N 104 enumerating a sequence of hyperparameter 107 combinations, wherein each hyperparameter 107 combination is a set of hyperparameters 107 to be evaluated. Each hyperparameter 107 combination is used to train one or more models 108 for that worker 1, 2, . . . , N 104 using the training data from the data set 200, wherein training statistics are calculated. The scoring data from the data set 200 is then used to score the models 108, wherein scoring statistics are calculated. One or more goodness metrics for the models 108 are then evaluated, wherein the goodness metrics may comprise one or more of the following: sum of mean-squared errors of the scoring data relative to the training data, precision of the scoring data relative to the training data, accuracy of the scoring data relative to the training data, an F-measure of the scoring data relative to the training data, etc.

Block 304 represents each of the workers 1, 2, . . . , N 104 generating a results data set as output 202 for the table operator, wherein the output 202 includes the hyperparameter 107 combinations, as well as runtime statistics, including training statistics, scoring statistics, and goodness values.

Experimental Results for the First Embodiment

An example of the usage of ParamSpaceEnumerator operator is shown below:

```
-- prepare the input data table
CREATE table input_data AS (
    SELECT DMA_ID, R_SEGM, F_SEGM, M_SEGM, MKTG_SPEND,
NORM_SALES
    FROM historical_sales
    WHERE MONTH_ID >= 201801)
-- create the parameters table
CREATE TABLE parameters (max_depth INT, n_estimators INT,
min_weight_fraction_leaf DOUBLE);
-- populate the parameters table with grid of 1000 combinations
INSERT INTO parameters SELECT * FROM
(VALUES (2),(4),(6),(8),(10),(12),(14),(16),(18),(20)),
(VALUES (3),(6),(9),(12),(15),(18),(21),(24),(27),(30)),
(VALUES (0),(0.05),(0.1),(0.15),(0.2),(0.25),(0.3),(0.35),(0.4),(0.45));
1000 records inserted
-- run the parameter search space enumeration
CREATE TABLE hpt_result AS (
SELECT *
FROM ParamSpaceEnumerator (
ON input_data REPLICATE
ON parameters PARTITION BY RANDOM
Trainer ('RandomForestRegressionTrain')
Scorer ('RandomForestRegressionPredict')
Split(0.75)
Metrics('accuracy')
)
-- view the top 10 contenders
SELECT top 10 FROM hpt_result ORDER BY accuracy DESC;
```

| Accuracy | Train time | Score time | Max depth | N estimators | Min weight fraction leaf |
|---|---|---|---|---|---|
| .964 | 3.962 | .180 | 20 | 21 | .00 |
| .964 | 5.084 | .229 | 20 | 27 | .00 |
| .964 | 5.797 | .262 | 20 | 30 | .00 |
| .963 | 2.842 | .132 | 20 | 15 | .00 |
| .963 | 3.452 | .154 | 20 | 18 | .00 |
| .963 | 4.558 | .213 | 20 | 24 | .00 |
| .962 | 4.515 | .210 | 18 | 24 | .00 |
| .961 | 4.843 | .224 | 18 | 27 | .00 |
| .960 | 3.867 | .164 | 18 | 21 | .00 |
| .960 | 5.534 | .238 | 18 | 30 | .00 |

Note that the exploration of the enumerated search space allows for more options than simply choosing the hyperparameters 107 with the best accuracy values. For example, the fourth combination offers almost identical accuracy (0.1% lower) with better scoring performance and may hence be a better choice.

Second Embodiment

In a second embodiment of this invention, a table operator named HyperParamOptimizer performs the following:
1. Takes as an input the data set that will be used for optimizing the hyperparameters 107. The data set includes both training and scoring data.
2. Takes as an input a table representing the metadata of all the combinations of the hyperparameters 107 in the search space.
3. Takes as an argument the names (identifiers) of both the training and scoring functions used for the computation of the objective function.
4. Takes as an argument the names (identifiers) of optimization algorithm to be used for the selective enumeration of the hyperparameters 107 search space. Examples of such optimization algorithm are grid search, random search, Bayesian optimization, gradient decent, and other optimization algorithms.
5. Optionally, takes as an argument the ratio of training/scoring random data split used for verification. Alternatively, may take the k-fold value for the choice of cross-validation. In addition, it takes the metrics to be used for comparison of the predicted and actual values for the measurement of the goodness of the model 108 generated by the model 108 parameters 107.

Similar to the ParamSpaceEnumerator table operator, the HyperParamOptimizer table operator is not limited to a particular machine learning algorithm, but is applicable to all training and scoring functions satisfying a standard API. The training and scoring functions are passed as arguments to the table operator and are loaded at runtime. The training and scoring functions are then executed as part of the objective function evaluation against the data set in the first input table and using hyperparameter 107 combinations from the second input table.

The syntax for the HyperParamOptimizer table operator is shown below:

```
SELECT *
FROM HyperParamOptimizer(
    ON <data_table>REPLICATE
    ON<hyperparameter_metadata_table> REPLICATE
    Trainer(<training_function>)
    Scorer(<scoring_function>)
    Optimizer(<optimizer_algorithm>)
    {Split(<split_ratio>) | KFold (<kfold_value>)}
    Metrics(<goodness_metrics>)
    ReturnsExploration({'OFF'|'ON'})
)
```

The SELECT statement returns a result set of records, comprising a set of columns, in this example, all columns (*), generated by HyperParamOptimizer. The FROM clause specifies the source of the data, in this example, the table operator labeled as HyperParamOptimizer, which may comprise a user-defined function (UDF), stored procedure (SP), built-in function, etc., of the RDBMS 103. The table operator accepts <data_table> (i.e., training and scoring data) and <hyperparameter_metadata_table> (i.e., metadata of all possible combinations of hyperparameters 107) as primary input tables or relations, wherein the ON clauses specify the input tables. The REPLICATE clauses instruct the RDBMS 103 to replicate both the <data_table> and <hyperparameter_metadata_table> across one or more of the compute units 104. The <training_function> and <scoring_function> can be specified on the table operator, as well as <goodness_metrics>, along with alternative clauses represented within the brackets, including <split_ratio> and <kfold_value>, wherein the vertical bars represent an "and/or" combination of the alternative clauses. The ReturnsExploration clause is a switch that is either Off or On, and returns all available data for exploration.

Figure 4:
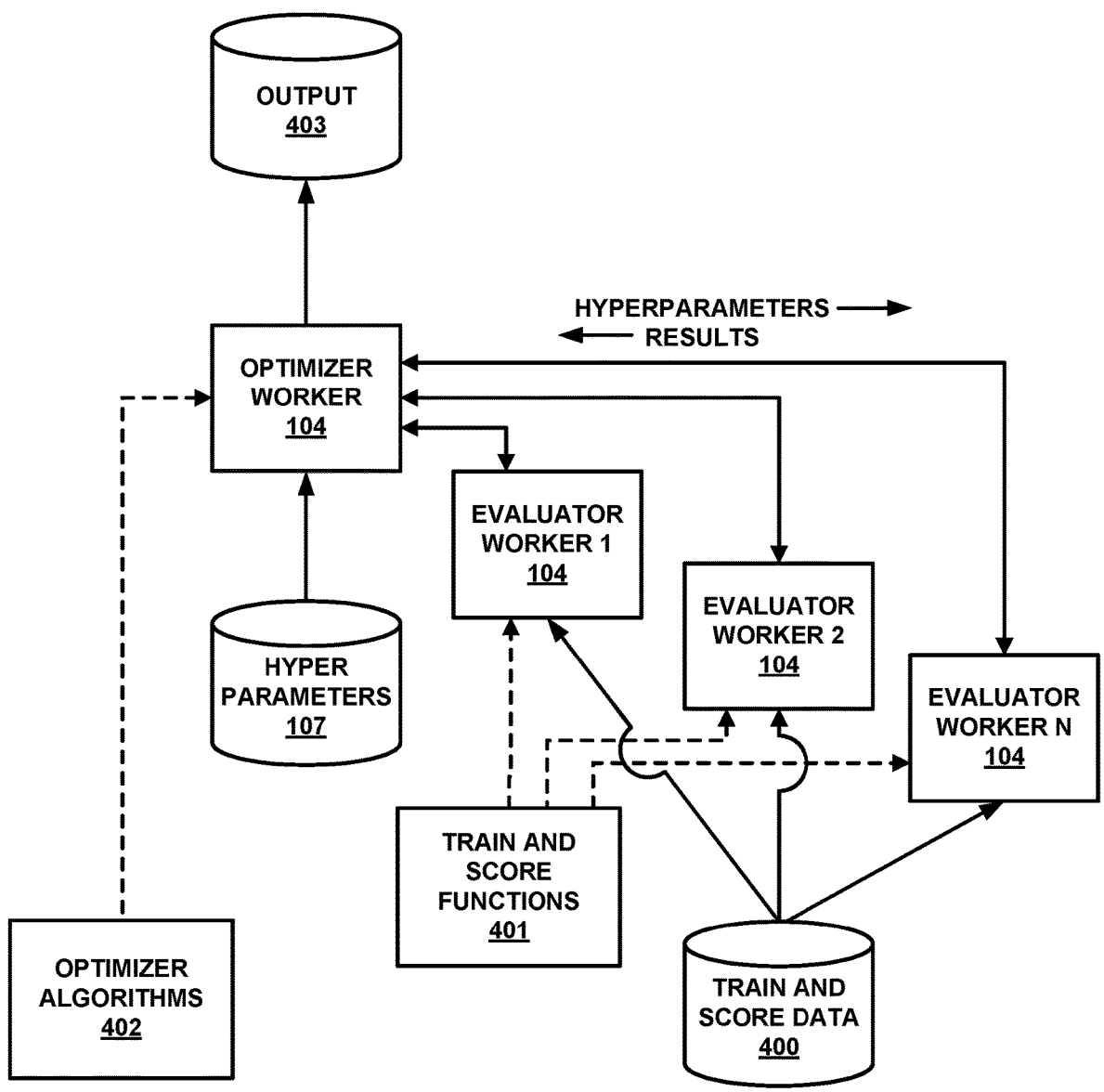
FIG. 4 is a schematic diagram that illustrates a workflow of a HyperParamOptimizer operator.
Figure 5:
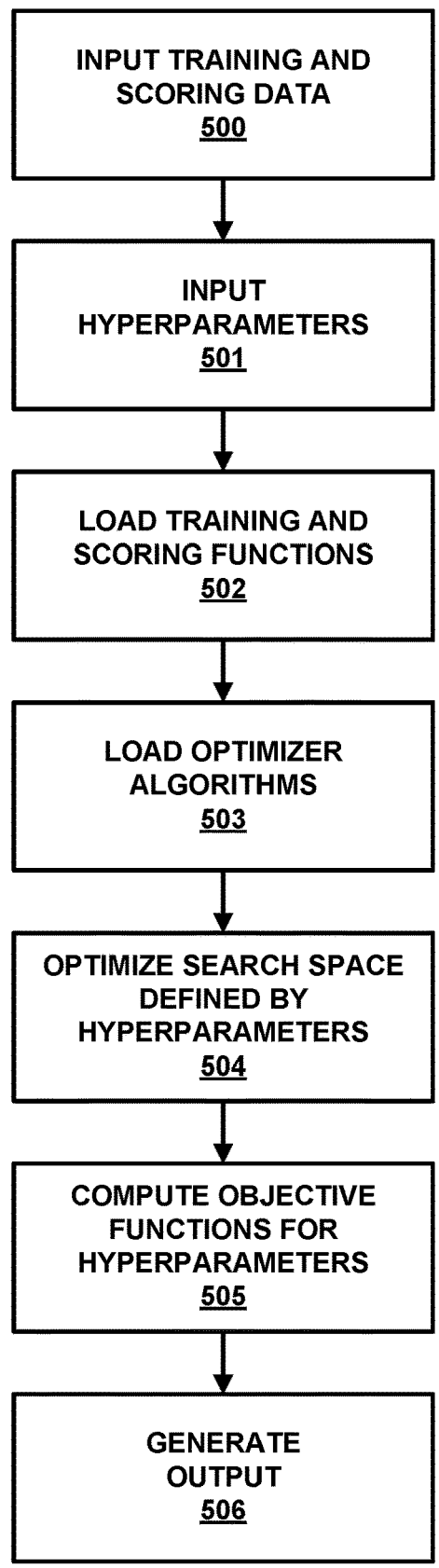
FIG. 5 is a flowchart that illustrates a workflow of the HyperParamOptimizer operator.

FIG. 4 is a schematic diagram and FIG. 5 is a flowchart that illustrate a workflow of the HyperParamOptimizer operator. In these figures, the compute units 104 are referred to as optimizer and evaluator workers 1, 2, . . . , N 104.

Block 500 represents the evaluator workers 1, 2, . . . , N 104 inputting a data set 400 comprised of training and scoring data that is used to build the machine learning models 108 and evaluate them. In this block, the data set 400 is replicated across the evaluator workers 1, 2, . . . , N 104, and then split into test and learning data. Alternatively, the data set 400 could be split first, and then replicated.

Block 501 represents the optimizer worker 104 reading the hyperparameters 107, which are used to drive the optimization. In this block, the hyperparameters 107 are read solely by the optimization worker 104.

Block 502 represents the evaluator workers 1, 2, . . . , N 104 loading training and scoring functions 401 for the models 108.

Block 503 represents the optimizer worker 104 loading an optimization algorithm 402 for the models 108.

Block 504 represents the optimizer worker 104 optimizing a search space defined by the hyperparameters 107 looking for an optimal hyperparameter 107 combination. Specifically, the optimizer worker 104 sends each evaluator worker 1, 2, . . . , N 104 a different combination of hyperparameters 107 to use to evaluate one or more objective functions.

Block 505 represents the evaluator workers 1, 2, . . . , N 104 computing the objective functions for each hyperparameter 107 combination. Each hyperparameter 107 combination is used to train one or more models 108 for that evaluator worker 1, 2, . . . , N 104 using the training data from the data set 400, wherein the training statistics are calculated. The scoring data from the data set 400 is then used to score the models 108, wherein the scoring statistics are calculated. One or more goodness metrics for the models 108 are then evaluated, wherein the goodness metrics may comprise one or more of the sum of mean-squared errors of the scored values relative to the test data values, precision, accuracy, F-measure, etc. The hyperparameter 107 combinations are sent to the optimizer worker 104, along with runtime statistics, including training statistics, scoring statistics, and goodness metrics. The optimizer worker 104 receiving the results from each evaluator worker 1, 2, . . . , N 104 synchronously or asynchronously depending on the optimization algorithm. The optimizer worker 104 decides on the next hyperparameter 107 combinations to evaluate, based on the optimization algorithm, and sends new requests to the evaluator workers 104. These steps performed by Block 505 may be repeated until a convergence is reached per the optimization algorithm.

Block 506 represents the optimizer worker 104 generating a results data set as output 403 for the table operator, wherein the output 403 includes the hyperparameter 107 combinations, as well as runtime statistics, including training statistics, scoring statistics, and goodness values. The optimizer worker 104 may return a "winning" hyperparameter 107 combination with its runtime statistics and goodness measure, or the evaluator workers 1, 2, . . . , N 104 and the optimizer worker 104 may return a results data set of all the hyperparameter 107 combinations that were considered, along their runtime statistics, including training statistics, scoring statistics, and goodness values, which is useful for debugging and/or exploring the optimization process.

Experimental Results for the Second Embodiment

An example of the usage of the HyperParamOptimizer operator is shown below:

```
-- run the parameter search space optimization
SELECT *
FROM HyperParamOptimizer (
ON input_data REPLICATE
ON parameters_metadata REPLICATE
Trainer ('RandomForestRegressionTrain')
Scorer ('RandomForestRegressionPredict')
Optimizer ('BayesianOptimization')
Split(0.75)
Metrics('Accuracy')
)
```

| Accuracy | Train time | Score time | Max depth | N estimators | Min weight fraction leaf |
|---|---|---|---|---|---|
| .964 | 3.962 | .180 | 20 | 21 | .00 |

Summary

In summary, this invention presents a novel approach for processing hyperparameter 107 tuning, which is an essential task in the data science life cycle, at high performance and scale. The approach utilizes an existing MPP system 100 and RDBMS 103 infrastructure. The processing occurs entirely in-platform, hence conforming to the data governance rules of the RDBMS 103.

Advantages and Benefits

Hyperparameter tuning is typically performed via analytics libraries and tools such as Scikit Learn™, R™ Sagemaker™, and DataRobots™. These solutions require pulling the data outside of the database system to perform the tuning process. The solution of this invention allows for efficient in-platform hyperparameter tuning, maintaining all the benefits and requirements of governance polices on the data. Issues such as recency of the data, security, and accessibility are automatically addressed and controlled by the database management system without risk of security validation or the data being stale. In addition, the combination of hyperparameter tuning with data manipulation, transformation, aggregation, and summarization operations offered by the database systems provides added flexibility and capability for performing data wrangling (on process input) and data analysis (on process output), all within the same platform.

It is possible to perform hyperparameter tuning through iterations of model learning and scoring calls to a database system that support machine learning algorithms driven by an application that manages the search and optimization of the hyperparameters. While this approach maintains data governance requirements, it falls short on performance due to the overhead of the large number of system calls (queries) involved. Each system call or query involves the priming of parallel execution for that particular query, a step that can become a significant portion of the overall execution time. As described herein, the in-platform solution of this invention provides orders of magnitude improvement in performance.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:
1. A computer-implemented apparatus, comprising:
(a) a relational database management system (RDBMS) executing in a computer system comprised of a plurality of compute units, wherein the RDBMS manages a relational database comprised of one or more tables storing data;

(b) the RDBMS executes in the plurality of compute units tuning hyperparameters for a machine learning model, while conforming to data governance rules and policies of the RDBMS, wherein the hyperparameters are control parameters used in construction of the model;

(c) the RDBMS implements the tuning of the hyperparameters as an operation that avoids moving data in and out of the RDBMS, wherein the operation is performed concurrently in the plurality of compute units that accepts training and scoring data for the model, constructs the model using the hyperparameters and the training data, and generates goodness metrics for the model using the scoring data; and (d) the RDBMS partitions a search space for the hyperparameters defined by one or more combinations of the hyperparameters stored in the tables across the plurality of compute units to parallelize the tuning of different combinations of the hyperparameters across the plurality of compute units without partitioning the training data across the plurality of compute units.

2. The apparatus of claim 1, wherein:

an enumerator enumerates the combinations of hyperparameters in the search space based on an optimization algorithm; and a function evaluator computes an objective function for the combinations of the hyperparameters enumerated in the search space, wherein the objective function computes one or more goodness metrics for the model generated using one or more of the combinations of the hyperparameters enumerated in the search space, to identify an optimal one of the combinations of the hyperparameters.

3. The apparatus of claim 2, wherein the plurality of the compute units perform the function evaluator concurrently using the search space that is partitioned across the plurality of compute units.

4. The apparatus of claim 2, wherein the operation includes training and scoring functions used for computation of the objective function.

5. The apparatus of claim 4, wherein the training data is used by the training function to train the model generated using the hyperparameters;

the scoring data is used by the scoring function to score the model trained by the training function; and the goodness metrics are used to evaluate the model scored by the scoring function.

6. The apparatus of claim 2, wherein the operation includes one or more optimization algorithms for the enumerator, and the enumerator performs a selective enumeration of the combinations of the hyperparameters in the search space based on the optimization algorithm.

7. The apparatus of claim 6, wherein the enumerator repeats the selective enumeration of the combinations of the hyperparameters in the search space until a convergence is reached based on the optimization algorithm.

8. The apparatus of claim 2, wherein the operation includes one or more arguments for: a ratio of the training and scoring data split used for verification; a k-fold value for cross-validation of the training and scoring data; and the goodness metrics used for comparison of predicted and actual values for the training and scoring data used by the model.

9. A computer-implemented method, comprising:

(a) executing a relational database management system (RDBMS) in a computer system comprised of a plurality of compute units, wherein the RDBMS manages a relational database comprised of one or more tables storing data;

(b) the RDBMS executes in the plurality of compute units tuning hyperparameters for a machine learning model, while conforming to data governance rules and policies of the RDBMS, wherein the hyperparameters are control parameters used in construction of the model;

(c) the RDBMS implements the tuning of the hyperparameters as an operation that avoids moving data in and out of the RDBMS, wherein the operation is performed concurrently in the plurality of compute units that accepts training and scoring data for the model, constructs the model using the hyperparameters and the training data, and generates goodness metrics for the model using the scoring data; and (d) the RDBMS partitions a search space for the hyperparameters defined by one or more combinations of the hyperparameters stored in the tables across the plurality of compute units to parallelize the tuning of different combinations of the hyperparameters across the plurality of compute units, without partitioning the training data across the plurality of compute units.

10. The method of claim 9, wherein:

an enumerator enumerates the combinations of hyperparameters in the search space based on an optimization algorithm; and a function evaluator computes an objective function for the combinations of the hyperparameters enumerated in the search space, wherein the objective function computes one or more goodness metrics for the model generated using one or more of the combinations of the hyperparameters enumerated in the search space, to identify an optimal one of the combinations of the hyperparameters.

11. The method of claim 10, wherein the plurality of the compute units perform the function evaluator concurrently using the search space that is partitioned across the plurality of compute units.

12. The method of claim 10, wherein the operation includes training and scoring functions used for computation of the objective function.

13. The method of claim 12, wherein the training data is used by the training function to train the model generated using the hyperparameters;

the scoring data is used by the scoring function to score the model trained by the training function; and the goodness metrics are used to evaluate the model scored by the scoring function.

14. The method of claim 10, wherein the operation includes one or more optimization algorithms for the enumerator, and the enumerator performs a selective enumeration of the combinations of the hyperparameters in the search space based on the optimization algorithm.

15. The method of claim 14, wherein the enumerator repeats the selective enumeration of the combinations of the hyperparameters in the search space until a convergence is reached based on the optimization algorithm.

16. The method of claim 10, wherein the operation includes one or more arguments for: a ratio of the training and scoring data split used for verification; a k-fold value for cross-validation of the training and scoring data; and the goodness metrics used for comparison of predicted and actual values for the training and scoring data used by the model.

17. A computer program product, the computer program product comprising a non-transitory computer readable storage medium having program instructions tangibly embodied therein, the program instructions executable by a computer system to cause the computer system to perform a method, comprising:

(a) executing a relational database management system (RDBMS) in a computer system comprised of a plurality of compute units, wherein the RDBMS manages a relational database comprised of one or more tables storing data;

(b) the RDBMS executes in the plurality of compute units tuning hyperparameters for a machine learning model, while conforming to data governance rules and policies of the RDBMS, wherein the hyperparameters are control parameters used in construction of the model;

(c) the RDBMS implements the tuning of the hyperparameters as an operation that avoids moving data in and out of the RDBMS, wherein the operation is performed concurrently in the plurality of compute units that accepts training and scoring data for the model, constructs the model using the hyperparameters and the training data, and generates goodness metrics for the model using the scoring data; and (d) the RDBMS partitions a search space for the hyperparameters defined by one or more combinations of the hyperparameters stored in the tables across the plurality of compute units to parallelize the tuning of different combinations of the hyperparameters across the plurality of compute units, without partitioning the training data across the plurality of compute units.

* * * * *